United States Patent
Van Boekel

[11] Patent Number: 5,871,785
[45] Date of Patent: Feb. 16, 1999

[54] INJECTION MOULDING SYSTEM AND HEATING ELEMENT FOR USE IN SUCH A SYSTEM

[75] Inventor: Franciscus Antonius Josef Van Boekel, Dordrecht, Netherlands

[73] Assignee: Eurotool Beheer B.V., Netherlands

[21] Appl. No.: 853,440

[22] Filed: May 9, 1997

[30] Foreign Application Priority Data

Oct. 5, 1996 [EP] European Pat. Off. .............. 96201292

[51] Int. Cl.⁶ .................................................. B29C 45/72
[52] U.S. Cl. ...................... 425/547; 264/378.15; 425/549
[58] Field of Search ..................................... 425/547, 548, 425/549; 264/328.15

[56] References Cited

U.S. PATENT DOCUMENTS 4,613,296  9/1986  Nagasaka ................................. 425/547

FOREIGN PATENT DOCUMENTS 0444748  9/1991  European Pat. Off. .
0653283  5/1995  European Pat. Off. .

OTHER PUBLICATIONS

Patent Abstracts of Japan vol. 15, No. 416 (M–1172), 23 Oct. 1991 & JP–A–03 176113 (Nissei Plastics Ind Co), 31 Jul. 1991.
Patent Abstracts of Japan vol. 95, No. 9, 31 Oct. 1995 & JP–A–07 142156 (Hitachi Ltd), 2 Jun. 1995.
Patent Abstracts of Japan vol. 95, No. 9, 31 Oct. 1995 & JP–A–07 142157 (Hitachi Ltd), 2 Jun. 1995.

*Primary Examiner*—Tim Heitbrink
*Attorney, Agent, or Firm*—Handal & Morofsky

[57] ABSTRACT

Injection moulding system comprising an elongated manifold having a melt passage extending from a common inlet, branching to a number of outlets; each of which outlet is connected to a central bore (3) of a heated elongated nozzle (1) discharging into a gate (4) leading to a moulding cavity, which nozzle (1) is at least partly surrounded by a heating element (17); the heating element (17) is designed such that its diameter or cross-sectional shape is adjustable; said heating element (17) is encased by a mantle piece (21) of which the internal diameter or internal cross-sectional shape is adjustable too, and a device is provided to clamp fit the heating element (17) with respect to the nozzle (1) under the action of the mantle piece (21).

19 Claims, 2 Drawing Sheets

INJECTION MOULDING SYSTEM AND HEATING ELEMENT FOR USE IN SUCH A SYSTEM

BACKGROUND OF THE INVENTION

1. Field of the Invention

This invention relates to an injection moulding system comprising an elongated nozzle having a cylindrical body with a central bore which is in fluid communication with a gate leading to a moulding cavity and a cylindrical heating element, forming a jacket having a longitudinal slot and tightening means for adjusting the dimensions of the slot, the heating element being at least partly located around the nozzle.

2. Description of Related Art Including Information Disclosed under 37 CFR 1.97 and 37 CFR 1.98

Injection moulding systems comprising a nozzle and a heating element are well-known for instance from Japanese patent application JP-A-3176113.

In this document a heating jacket or band heater is formed by a clamping plate, a cylindrical body and a clamping screw. When placed around the nozzle, a thermalcouple can extend in the longitudinal gap of the band heater.

From EP-A-0444748 a heating element is known comprising a coiled heating wire which is embedded in a solid metal body. The heating element is in close fitting contact with the outside of the nozzle circumference and is positioned by means of a clamping device. The known heating element has as a disadvantage that upon removal thereof, for instance for maintenance or replacement purposes, the nozzle assembly has to be disassembled and the heating element has to be slid along the nozzle in the axial direction.

SUMMARY OF THE INVENTION

It is therefore a purpose of the present invention to provide an injection moulding system having a heating element which can be easily placed around the nozzle and removed therefrom. It is a further object of the present invention to provide a heating element which is cost-effective, which is of simple design and which allows for improved serviceability.

Thereto the injection moulding system according to the present invention is characterized in the heating element comprises a cylindrical inner wall, a cylindrical outer wall, concentric with the inner wall and a heating wire located between said walls, the heating wire being embedded in a heat conducting material, wherein the heating element comprises a longitudinal hinge line, spaced away from the longitudinal slot, along which hinge line the thickness of the heat conducting material is at least reduced.

By the longitudinal hinge line, the cylindrical heating element according to the present invention can be opened, and closed such that the longitudinal slot can be made wide enough for the nozzle to be inserted through that slot. In this way it is possible to place the heating element around the nozzle in a radial direction, such that the nozzle assembly does not have to be disassembled.

In the injection moulding system of the present invention, the cylindrical walls of the heating element can be formed by boundary walls of the heat conducting material. It is however also possible that the cylindrical inner and outer walls are formed of separate plate material.

By reducing the thickness of the heat conducting material along the hinge line, or by reducing the thickness of the plate material of the outer and/or inner annular wall (for instance by scoring or cutting) the heating element can be opened along the hinge line. Preferably the heat conducting material is totally absent in the region of the hinge line.

It is also possible that the heating element comprises two substantially separate walls which are connected along the hinge line, for instance by a separate hinging element connected to the outer cylindrical wall. This may for instance be the case when the heating wire extends substantially in the axial direction of the nozzle.

BRIEF DESCRIPTION OF THE DRAWINGS

Further objects and advantages of the invention will appear from the following description, taken together with the encompanying drawings, illustrating non-limiting preferred embodiments.

DESCRIPTION OF THE PREFERRED EMBODIMENTS

Figure 1:
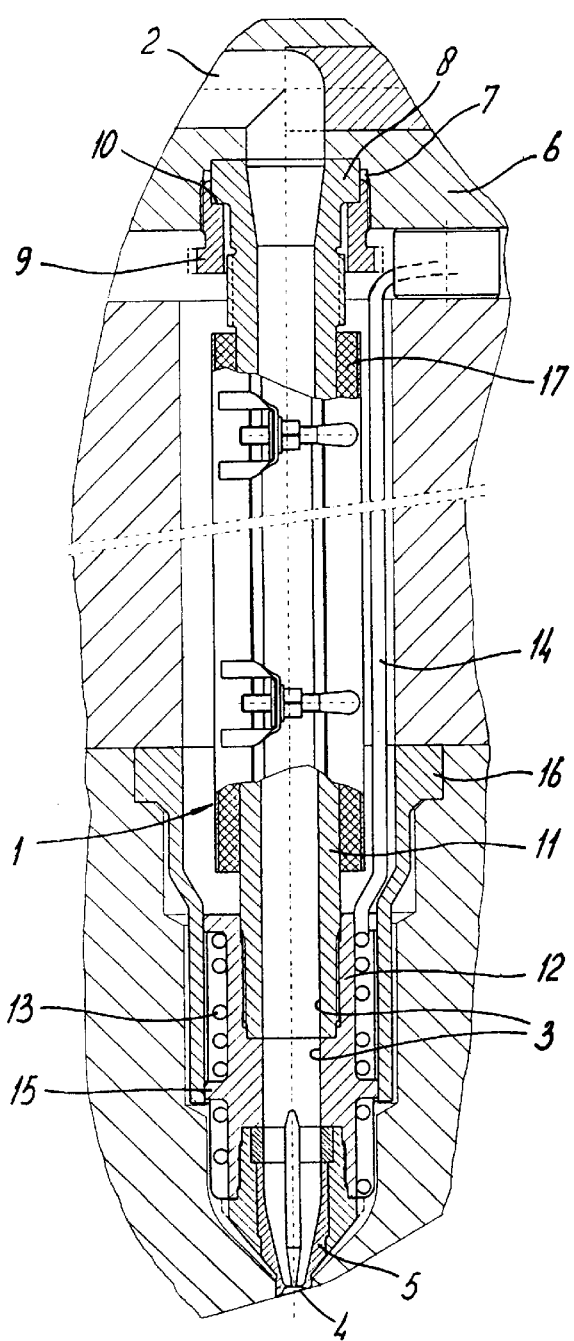
FIG. 1 is a sectional view of a portion of an injection moulding system, showing a heated nozzle seated in a socket holder according to one embodiment of the invention, partly cut away.
Figure 2:
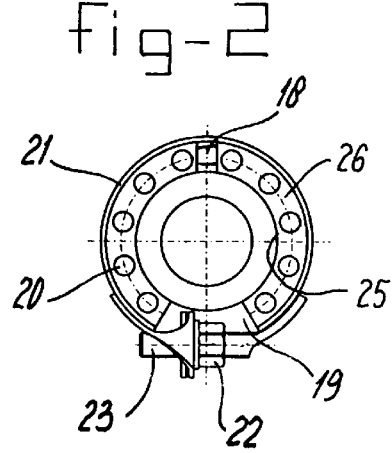
FIG. 2 is a cross-sectional view of the heated nozzle according to FIG. 1.

Reference is first made to FIG. 1, which shows a portion of a multi-cavity injection moulding system, showing a heated elongated nozzle 1. The nozzle 1 is secured to a common elongated manifold. As is common in the art, a melt passage 2 extends through the manifold from an inlet in a manifold extension for connection with the outlet of an injection moulding machine (not shown). The melt passage 2 extends from the manifold through a central bore 3 of the nozzle 1 and to a gate 4 leading to a cavity (not shown). The melt passage 2 also extends through a seal insert 5 which is seated in the nose portion of the nozzle 1 and forms an extension of the bore 3.

According to the invention, the nozzle 1 is suspended from a supporting plate 6. For this purpose, the supporting plate 6 is provided with an internally threaded blind-hole 7 with a stepped portion. The socket 8 of the nozzle 1 is tightly toleranced received within the stepped portion of the hole 7. The socket 8 is clamped in place by an externally threaded nut 9, having a stepped portion bearing against a shoulder 10 on the socket 8. The supporting plate 6 and the socket 8 can be of relatively soft material, and the nut 9 of relatively hard material, such that damage will not occur to the screw thread of the nut. In this way, it is possible to insert the nozzle 1 in the supporting plate 6 from below too, such that it can e.g. easily be replaced, without the need for laborious disassembling the manifold-assembly in and above the supporting plate 6. Since the elongation part (11) is rather flexible compared to the rest of the construction, expansion of the manifold system has no influence on the position of the gate 4 at the end of the nozzle 1. And, by the use of the nut 9, positioning of the bore 3 is made less difficult.

The manifold is heated by a heating element (not shown) which is integrally brazed in the manifold-assembly, and which is common in the art.

Furthermore, the nozzle 1 is made up from an elongation part 11 with adaptable dimensions, and an end part 12 of standard dimensions. By virtue of this, for assembling nozzles 1 of different length, merely elongation parts 11 of different length must be kept in storage, reducing manufacturing and storage costs. The end part 12 is internally screw-threaded on the lower end of the elongation part 11. As is indicated in FIG. 1, the end part 12 is encircled by a helically wound electrically heating wire 13, or similar heating element. The wire 13 can be integrated with the end part 12. A connecting wire 14 is connected to the heating wire 13 and extends parallel to the nozzle 1 towards the supporting plate 6, for connection to a power supply (not shown). As shown in the drawing, the seal insert 5 is externally screw-threaded in the end part 12. The end part 12 also has two circumferential shoulders 15, spaced apart in the longitudinal direction, for clamp fit with a socket holder 16 which encircles a region of the nozzle 1 between its ends at a certain distance. The spacing between the socket holder 16 and the nozzle 1 is used to balance expansion due to temperature differences. The socket holder 16 aligns the seal insert with the central bore 3. Radial forces due to thermal expansion of the supporting plate are accommodated by the socket holder rather than by the seal insert 5. Furthermore, the socket holder provides for a thermal isolation between the hot nozzle part 11 and the colder cavity plate. Finally, the socket holder 16 forms a second seal against leakage of the melt along the insert 5.

The elongation part 11 is encircled by a heating element 17 in the form of a jacket. Unlike the end part 12, this heating element 17 is no integral part of the elongation part 11 of the nozzle 1. According to the invention, the heating element 17 is a separate cylindrical jacket. A hinge line 18 is provided over the total height of the heating element body 17, viewed in its longitudinal direction. Furthermore, the cylindrical body of the heating element 17 defines an open slot 19 extending over the total height of the body of the heating element 17, viewed in the longitudinal direction. The heating wire 20 embedded in the cylindrical body 17 follows a serpentine path, extending up and down parallel to the longitudinal direction of the nozzle 1, turning up or down at the lower or upper end, respectively, of the cylindrical body of the heating element 17. The wire 20 is embedded in appropriate moulding or sintering material 26. At the hinge 18, there is no embedding material present, and the embedded parts of the cylindrical body of the heating element 17 at both sides of the hinge 18 are joined by merely the exposed wire 20.

The cylindrical body of the heating element 17 is surrounded by a cylindrical outer wall 21, with adjustable diameter. For this purpose, the cylindrical outer wall 21 is slotted in its lengthwise direction, and the opposing slot edges can be brought together by tightening a nut, connected to the one edge of the outer wall 21 and screw threaded onto a screw threaded rod 23 connected to the opposing edge of the outer wall. As is shown in FIG. 1, several bolt 23 and nut 22 assemblies are provided spaced apart in the longitudinal direction of the heating element 17. The outer wall 21 is made from relatively thin sheet metal, and makes sure that the cylindrical jacket of the heating element 17, comprising the heating wire 20, is reliably pressed against the elongation part 11 of the nozzle 1 in a relatively large contact area. The inner wall 25 of the heating element 17 may be formed by the heat conducting material 26 or can be made of thin sheet material which together with the outer wall 21 defines an annular space into which the heat conducting sintering material can be cast.

With the cylindrical jacket of the heating element 17 embedding the heating wire 20 in combination with the outer wall 21, the heating element for the elongation part 11 of the nozzle 1 can easily be replaced by untightening the nuts 22. The two halves of the jacket of the heating element 17 can be bent along the hinge line 18 such that the gap 19 corresponds to the diameter of the nozzle part 11. Furthermore, a proper heating contact is provided between the heating wire 20 and the nozzle 1. Apart from that, the heating element 17 is a rather low cost and reliable piece of equipment. Of course, the heating element 17 according to the invention can be applied to other nozzle-types as well, apart from the combination of the elongation part 11 and the end part 12.

The supporting plate 6 is held in place by locating rings 24 (of which only one is shown in the drawing).

Figure 3:
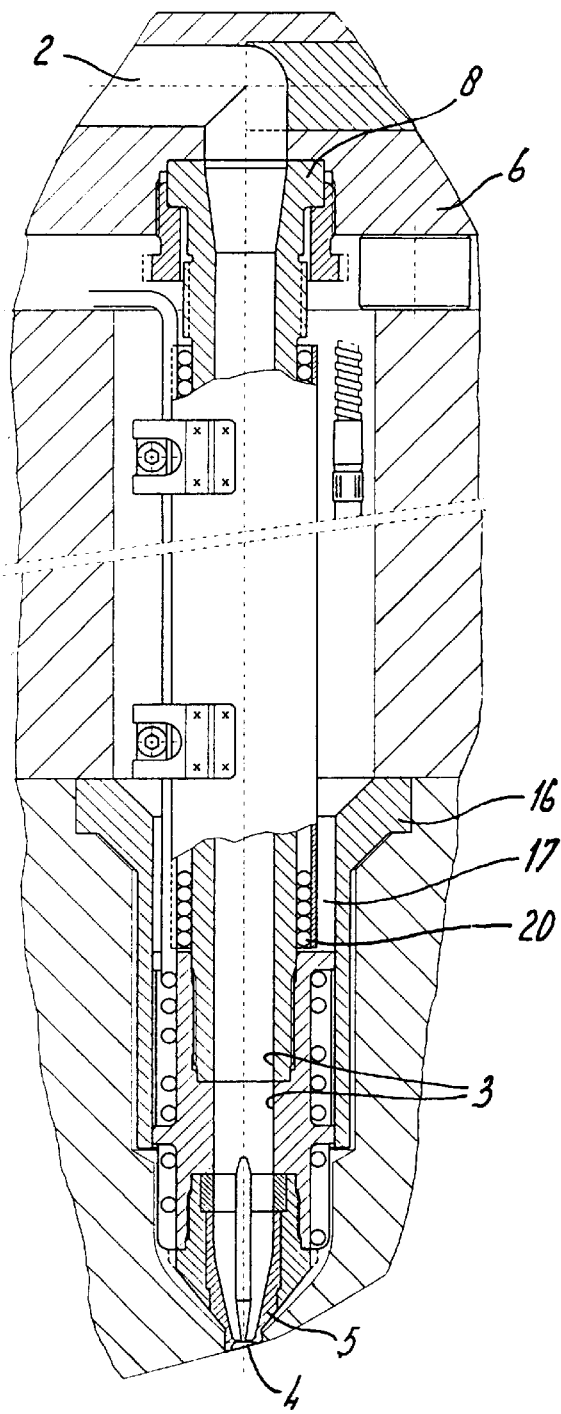
FIG. 3 is a view corresponding to FIG. 1 of a further embodiment.
Figure 4:
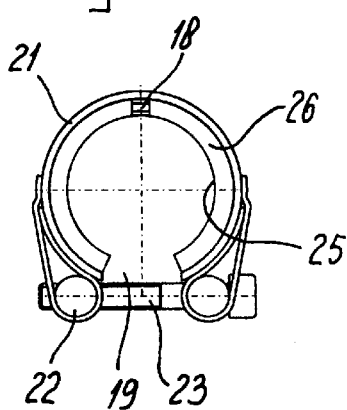
FIG. 4 is a cross-sectional view of the heated nozzle shown in FIG. 3.

Now referring to FIG. 3, an alternative embodiment of the invention is shown. Compared to FIG. 1, mainly the socket holder 16 and the heating element 17 differ. With respect to the heating element 17, the wire 20 now follows a zig-zag path extending between the opposite edges of the slot 19, encircling the nozzle 1, except for the width of the slot 19. Again, at the hinge 18, the embedding material of the heating element 17 is left out, such that a plurality of wire parts, present in succession in the longitudinal direction of the cylindrical body of the heating element 17, are exposed here. Again, the heating element 17 is surrounded by a slotted outer wall 21. Provided by an alternative design of the bolt 23 and nut 22 assembly, the diameter of the outer wall 21 is adjustable such that the heating element 17 can be clamped around the nozzle 1.

It is appreciated, that several modifications can be made without departing the scope of the present invention. For instance, the hinge 18 of the heating element 17 can be provided in a different way, e.g. by making the cylindrical body of the heating element 17 thinner at that point, without exposing the wire 20. Apart from that, the slotted outer wall can be dimensioned such that the edges of the slot overlap. Other designs for the adjustment of the diameter of the outer wall 21 lie within the scope of the invention as well. It is even possible, to have a slotted outer wall 21 with such high elastical properties under bending, that the cylindrical body of the heating element 17 is spring-biassed around the nozzle 1 merely by the slotted outer wall 21, without the need for additional tightening means, such as the bolt 23 and nut 22 assembly, if the internal diameter of the outer wall 21, in its unstretched condition, is substantially smaller than the outer diameter of the cylindrical body of the heating element 17 if firmly applied around the nozzle 1. There can be more than one layer of wire 20 over the thickness of the jacket of the heating element 17.

Figure 5:
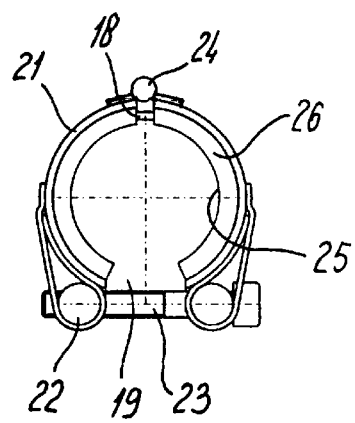
FIG. 5 is a view similar to FIG. 4 of a heated nozzle comprising a hinging element.

FIG. 5 shows an embodiment wherein the outer wall 21 is comprised of two wall parts that are connected via a hinging element 24.

It is furthermore appreciated, that the design of the nozzle 1 assembled from a standard part 12 and a taylor made extension part 11 can be applied independent from the particular heating element 17 and the suspension of the nozzle 1 from the supporting plate 6 as indicated in FIG. 1 and FIG. 3, and described above. The same counts for the suspension of the nozzle 1 from the supporting plate 6, which can be applied independent from the particular heating element 17 and the particular two piece design of the nozzle 1 as shown in FIG. 1 and FIG. 3.

I claim:

1. Injection moulding system comprising an elongated nozzle (1) having a cylindrical body with a central bore (3) which is in fluid communication with a gate (4) leading to a moulding cavity and a cylindrical heating element (17), the cylindrical heating element (17) forming a jacket having a longitudinal slot (19) and tightening means (22, 23) for adjusting the dimensions of the slot (19), the heating element (17) being at least partly located around the nozzle, wherein the heating element comprises a cylindrical inner wall (25), a cylindrical outer wall (21), concentric with the inner wall and a heating wire (20) located between said walls, the heating wire being embedded in a heat conducting material (26), wherein the heating element comprises a longitudinal hinge line (18), spaced away from the longitudinal slot (19), along which hinge line (18) the thickness of the heat conducting material (26) is at least reduced compared to the thickness of the heat conducting material adjacent said hinge line (18), whereby the heating element (17) can be opened sufficiently to permit the heating element to be assembled around the nozzle (1) in a radial direction.

2. Injection moulding system according to claim 1, wherein the hinge line (18) is located substantially diametrically opposite the longitudinal gap (19).

3. Injection moulding system according to claim 1, wherein at least one of the inner and outer cylindrical walls (21, 25) is formed of plate material which along the hinge line (18) is provided with a hinging element.

4. Injection moulding system according to claim 1, wherein the heating wire (20) is exposed at the hinge line (18).

5. Injection moulding system according to claim 1, the tightening means (22, 23) being spaced apart viewed in the longitudinal direction of the nozzle (1).

6. Injection moulding system according to claim 1, wherein the heating wire (20) of the heating element (17) substantially extends parallel to the longitudinal direction of the nozzle (1) from the one longitudinal end to the other in an alternating serpentine path up and down.

7. Injection moulding system according to claim 1, the nozzle (1) being assembled from a standard part (12) of standard dimensions, provided adjacent the manifold system (2), and comprising an extension part (11) configured to facilitate fitting of the nozzle (1) to the injection moulding system, the extension part (11) extending the standard part (12) to the gate (4).

8. Injection moulding system according to claim 7, wherein the heating element (7) is provided around the said extension part (11) and the standard part (12).

9. Injection moulding system according to claim 1, wherein the nozzle (1) is suspended from a supporting plate (6), a socket element (8) of the said nozzle (1) is clamp fitted with respect to the supporting plate (6) by a separate nut-element (9) screw threaded to the supporting plate (6) and having a stepped portion, the stepped portion engaging a shoulder (10) on the said socket element (8), the nut-element preferably being of harder material compared to that of the supporting plate (6) and the socket (8).

10. Injection moulding system according to claim 1, wherein the heating wire (20) of the heating element (17) substantially extends perpendicularly to the longitudinal direction of the nozzle (1) in a zig-zag path within the heating element (17) repeatedly from the one edge of the slot (19) towards an opposite edge to cover the circumferential area of the heating element (17).

11. Heating element (17) forming a jacket for clamping around a nozzle of an injection moulding system, the heating element having a longitudinal slot and tightening means (22, 23) for adjusting the dimensions of the slot (19), wherein the heating element comprises a cylindrical inner wall (25), a cylindrical outer wall (21), the cylindrical outer wall (21) being concentric with the inner wall, and a heating wire (20) located between said walls, the heating wire being embedded in a heat conducting material (26), wherein the heating element comprises a longitudinal hinge line (18), spaced away from the longitudinal slot (19), along which hinge line (18) the thickness of the heat conducting material (26) is at least reduced compared to the thickness of the heat conducting material adjacent said hinge line (18), whereby the heating element (17) can be opened sufficiently to permit the heating element to be assembled around the nozzle (1) in a radial direction.

12. Heating element according to claim 11, wherein the hinge line (18) is located substantially diametrically opposite the longitudinal gap (19).

13. Heating element according to claim 11, wherein at least one of the inner and outer cylindrical walls (21, 25) is formed of plate material which along the hinge line (18) is provided with a hinging element.

14. An apparatus for a longitudinally extending injection moulding nozzle, said apparatus comprising a heating element having:

a) an annular configuration to fit closely around the nozzle to transfer heat thereto;

b) a longitudinal slot defining edges in the heating element; and c) at least one longitudinal hinge permitting flexure of the heating element about the at least one hinge by separating the longitudinal edges defined by the longitudinal slot;

whereby the heating element can be opened to a configuration enabling the heating element to be fitted around the moulding nozzle by moving the heating element in a direction transversely to the longitudinal extent of the nozzle.

15. Apparatus according to claim 14 wherein the heating element has a thickness transverse to the longitudinal extent of the nozzle sufficient for rigidity and has a reduction of the thickness sufficient to permit flexure about the at least one hinge.

16. Apparatus according to claim 15 comprising a heating wire embedded in thermally conductive material the heating wire extending transversely across the at least one hinge with a configuration permitting flexure of the heating element about the hinge.

17. Apparatus according to claim 16 wherein the at least one hinge defines at least two sections of the heating element and the heating wire has a sinuous configuration in each section to distribute heat throughout the section.

18. Apparatus according to claim 14 comprising a tightening device to adjust the transverse dimension of the longitudinal slot.

19. Apparatus according to claim 14 comprising a heating element, wherein the heating element is fitted around said injection moulding nozzle.

* * * * *